United States Patent [19]
Bolcavage

[11] Patent Number: 5,161,751
[45] Date of Patent: Nov. 10, 1992

[54] FISHING REEL

[76] Inventor: Richard Bolcavage, R.D. #2 Box 2133, Golden St., Kirkwood, N.Y. 13795

[21] Appl. No.: 442,751

[22] Filed: Nov. 29, 1989

[51] Int. Cl.⁵ .............................................. A01K 89/01
[52] U.S. Cl. .................................................... 242/322
[58] Field of Search ........................................ 242/322

[56] References Cited

U.S. PATENT DOCUMENTS

| 2,535,746 | 12/1950 | Mitchell | 242/322 X |
| 3,067,965 | 12/1962 | Breithaupt | 242/322 X |
| 3,084,885 | 4/1963 | Hornbostel | 242/242 |
| 4,076,185 | 2/1978 | Dorph | 242/322 X |
| 4,077,587 | 3/1978 | Ueda | 242/255 |
| 4,390,147 | 6/1983 | Zuckerman | 242/255 |

Primary Examiner—Katherine Matecki
Attorney, Agent, or Firm—Salzman & Levy

[57] ABSTRACT

A fishing reel of the oscillating or reciprocating spool type features a bifurcated drum. The drum is separated into a large drum and a small drum. The line speed will vary upon reel-in as the line is periodically or alternately switched between the different sized wind-up drums.

15 Claims, 2 Drawing Sheets

FISHING REEL

FIELD OF THE INVENTION

This invention relates to fishing reels, and more particularly to a variable speed fishing reel that simulates the swimming motions and actions of a fish or insect.

BACKGROUND OF THE INVENTION

Recent studies have shown that fish are attracted to other fish in a variety of ways that involve sight, smell and motion sensing. Often the erratic motion of another fish is the primary attraction in luring a fish to strike.

One of the best ways to attract a fish is to simulate the swimming motion or actions of a wounded fish or insect. Anglers have instinctively known this for a long time, in that they often play with the line in order to attract, or induce a fish to bite at the bait. Erratic motions such as tugging on the line are often performed by anglers.

Unfortunately, the effort required to maintain erratic motions can be considerable and often becomes a burden to the angler at precisely the time it is most needed. By the end of the day, a typical angler has little energy or desire to create the sort of variations in line movement that would be most effective in attracting a fish.

In the field of fishing reels, designers are also aware that line speed upon "reel-in" of the fishing line can be varied to simulate these fish or insect movements. They achieve variation in reel-in speed by means of a set of gears. These gears are generally complex and make the fishing reel expensive.

Also, the rate at which the reel is cranked changes with the selection of each gear. Such reels are shown in U.S. Pat. Nos. 4,077,587; 4,148,228 and 4,390,147.

In U.S. Pat. No. 4,076,185, issued: Feb. 28, 1978 to Dorph, a duplex fishing reel is shown wherein a portion of the fishing line is wound on an auxiliary spool of smaller diameter than a main spool. The purpose of this fishing reel is to provide a smooth flow of the fishing line during the casting procedure. A plurality of knobs is disposed on the main spool and parallel to the major axis thereof to prevent the line from unwinding from the main spool when initiating an unwinding operation on the auxiliary spool.

While the present invention also features large and small diameter spools similar to the aforementioned fishing reel of U.S. Pat. No. 4,076,185, its operation and purpose is completely different.

It is an object of this invention to provide an improved fishing reel wherein the swimming motion of a wounded fish or insect can be simulated.

Another object of the invention to accomplish the above objective is to vary the reel-in line speed, while substantially maintaining the same cranking rate.

Still another object of this invention is to construct a variable speed fishing reel that does not require complex gearing.

A further object of the invention is to provide speed variation automatically, without the need to select a gear or throw a lever.

SUMMARY OF THE INVENTION

The invention is concerned with the problem of varying the reel-in line speed during the cranking of the spool. The reel of this invention uses a line guide disc disposed between two different spools to alternate the uptake between the large and small spool drums continuously. It should be noted, however, that the invention is not restricted only to two different sized drums. If the cranking speed is held fairly constant, the reel-in line speed will alternately speed up and slow down as the fishing line is wound alternately between the different sized drums.

The line guide disc of the invention has cam-like projections on its periphery to engage the fishing line as the reel is cranked, thus switching between or among the spools approximately once every full revolution of the crank.

The invention relates to an oscillating or reciprocating reel spool for alternately varying the reel-in line speed, without having to vary the cranking rate.

The reel spool comprises a first spool drum and a second spool drum disposed adjacent to the first spool drum. The second spool drum has a larger diameter than the first spool drum. Fishing line wound upon the second, larger spool drum will have a greater reel-in line speed than will line wound upon the first, smaller spool drum.

The spool drums are wound at a substantially steady cranking rate, although the cranking rate can also be varied to some degree without departing from the spirit and purpose of the invention.

An interposing line guide member is disposed between the two spool drums. The interposing guide includes a disc having spaced-apart projections extending radially from the peripheral edge of the disc. That is, the projections are disposed perpendicularly to the major axis of the drum. The projections have a straight edge and a curved, cam-like surface.

As the fishing line is reciprocally wound upon one of the spool drums, the line passes over the projections of the interposing guide and is caused to be switched to the adjacent drum.

In this manner, the take-up of the line will alternate back and forth between the spool drums. Hence, the line speed during reel-in will alternately speed up and slow down about once every revolution of the winding crank. Thus, the line speed will automatically be switched without any overt or conscious effort on the part of the angler.

BRIEF DESCRIPTION OF THE FIGURES

A better understanding of the invention will be obtained with reference to the subsequent detailed description considered in conjunction with the accompanying drawings, in which.

DETAILED DESCRIPTION OF THE PREFERRED EMBODIMENT

Generally speaking, the invention features a fishing reel of the oscillating or reciprocating spool type, such as that shown in the U.S. Pat. No. 3,084,885; issued:

Apr. 9, 1963, or which can be purchased commercially from Abu Garcia, "Cardinal" series models.

The reciprocating spool causes the fishing line to traverse the full length of a conventional spool during reel-in. In this manner, the line is evenly wound upon the spool drum, such that there is less of a tendency for the line to snag during casting.

The invention has split the spool into two different sized drums separated by an interposing guide member.

As the line is reeled-in, the guide member directs the line back-and-forth between the drums, causing the line speed to periodically change approximately once every cranking revolution.

The changing line speed causes the bait or lure at the end of the fishing line to simulate the swimming motions of a wounded fish or insect.

This, in turn, is an attraction for inducing the fish to strike at the bait or lure.

For purposes of brevity and clarity, like components will have the same designation throughout the figures.

Figure 1:
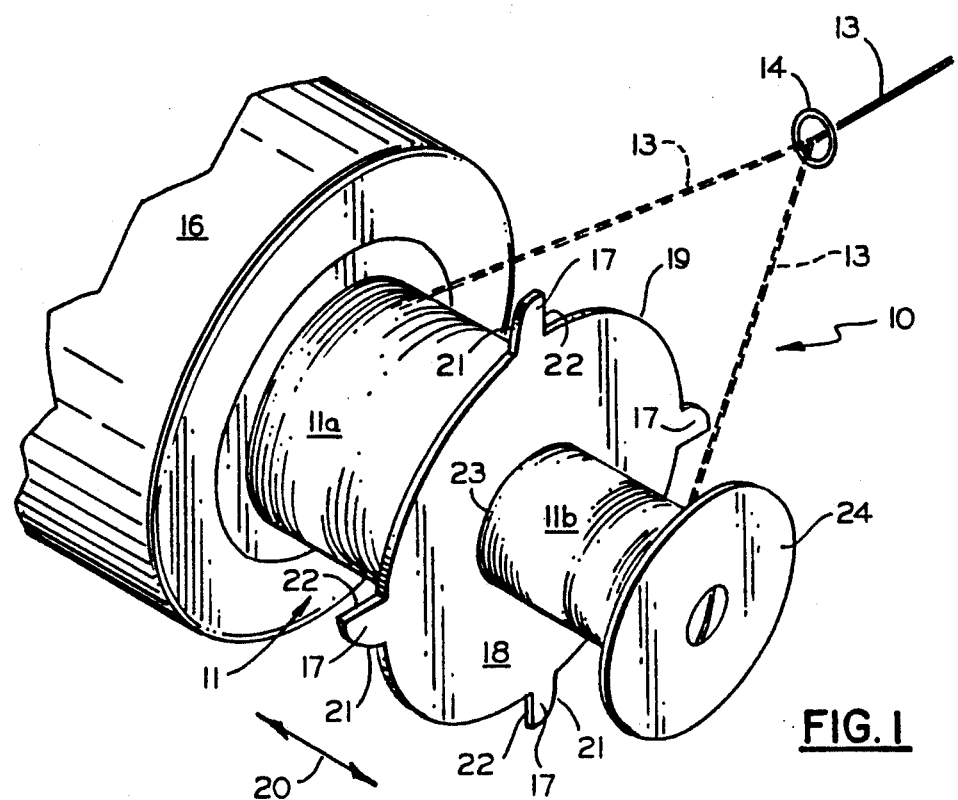
FIG. 1 is a perspective view of the fishing reel spool of this invention.
Figure 3:
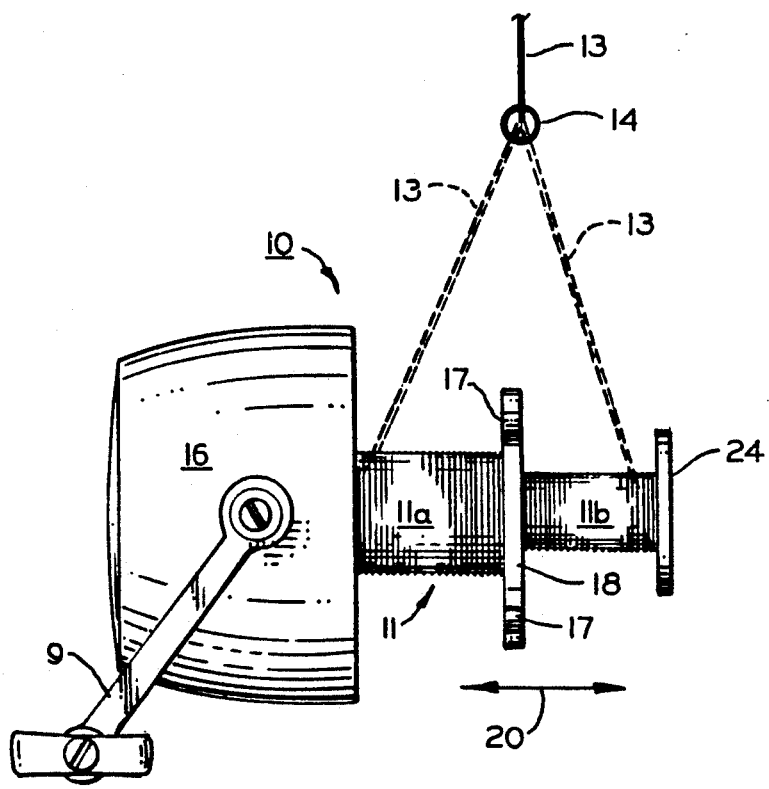
FIG. 3 is a side view of the preferred embodiment of the inventive fishing reel shown in FIG. 1.

Now referring to FIGS. 1 and 3, a fishing reel 10 of the reciprocating or oscillating spool-type is shown. The reel 10, shown in the perspective and side views, respectively, comprises a cranking handle 9 for rotating a eyelet line guide 14 and reciprocating (arrow 20) the spool 11 within housing 16. The spool 11 comprises a large diameter drum 11a and a small diameter drum 11b.

When the cranking handle 9 rotates and reciprocates the spool 11, the fishing line 13, which is fed through the rotating eyelet line guide 14, is caused to reciprocate back-and-forth between, and wind upon, respective drums 11a and 11b. Drums 11a and 11b do not rotate during reel-in operations, but in the preferred embodiment drums have a ratchet mechanism, not shown, to allow them to rotate during payout operations.

Figure 2A:
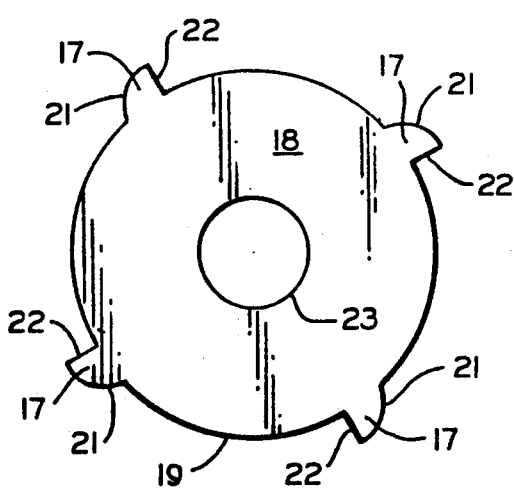
FIG. 2a is a plan view of the interposing guide of the fishing reel invention shown in FIG. 1.

An interposing guide member 18, also shown in the plan view of FIG. 2a, fixedly divides the small and large drums 11b and 11a, respectively.

Interposing guide member 18 comprises a flat disc having a generally circular periphery 19 from which a number of cam-like projections 17 extend.

The extending projections 17 are evenly spaced about the periphery 19 of the disc 18. Each projection 17 is characterized by a straight, line-engaging surface 22, and a curved rear surface 21, as illustrated. The curved surface allows the line to come off smoothly during casting.

As the line 13 is caused to reciprocate (arrows 20) between the drums 11a and 11b, respectively, the interposing guide member 18, which is stationary with respect to drums 11a and 11b, provides a smooth transition between the drums 11a, 11b, such that the line 13 is evenly distributed thereon. It should be noted that the reciprocating direction (arrows 20) is along the major axis (not shown) of the drums 11a, 11b.

The line 13 is evenly and smoothly urged to the adjacent drum, as the line 13 passes over, and comes into contact with the surface 22 of one of the projections 17.

Interposing guide disc 18 has a circular hole 23 concentrically placed in the middle thereof, allowing it to be fixedly disposed in a circular slot (not shown) located between drums 11a and 11b.

Interposing guide 18 reciprocates in unison with the drums 11a and 11b, and line 13 is caused to wind upon each drum in a periodic and alternating fashion.

Line 13 is caused to change drums approximately once every revolution of crank 9, in the preferred embodiment. It should be understood, however, that with certain modifications in gearing, this rate may be less than or greater than once per revolution of crank 9. End guide 24 prevents line 13 from coming off spool 11.

The drums 11a, 11b, being of different diameter size, will cause the "take-up" or "reel-in" speed of line 13 to change from fast (large drum 11a) to slow (small drum 11b) and back again, as line 13 is wound thereupon.

In this way, the bait or lure (not shown) at the end of line 13 will likewise be caused to speed up and slow down as the line 13 is reeled in.

Figure 2B:
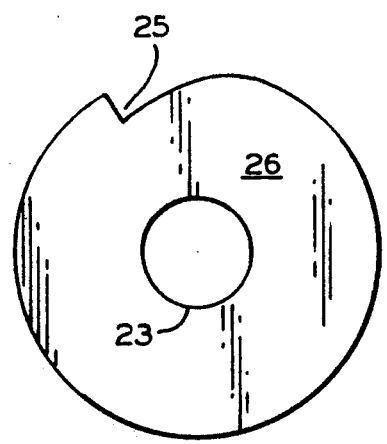
FIG. 2b is a plan view of an alternate embodiment of the interposing guide.

Referring now to FIG. 2b, there is shown an alternate embodiment of the interposing guide member. A notch 25 is cut into a disc 26 to accomplish the drum switching purpose of the interposing guide member 18 (FIG. 2a). It should be understood that a plurality of notches, not shown, can also be used.

Figure 4:
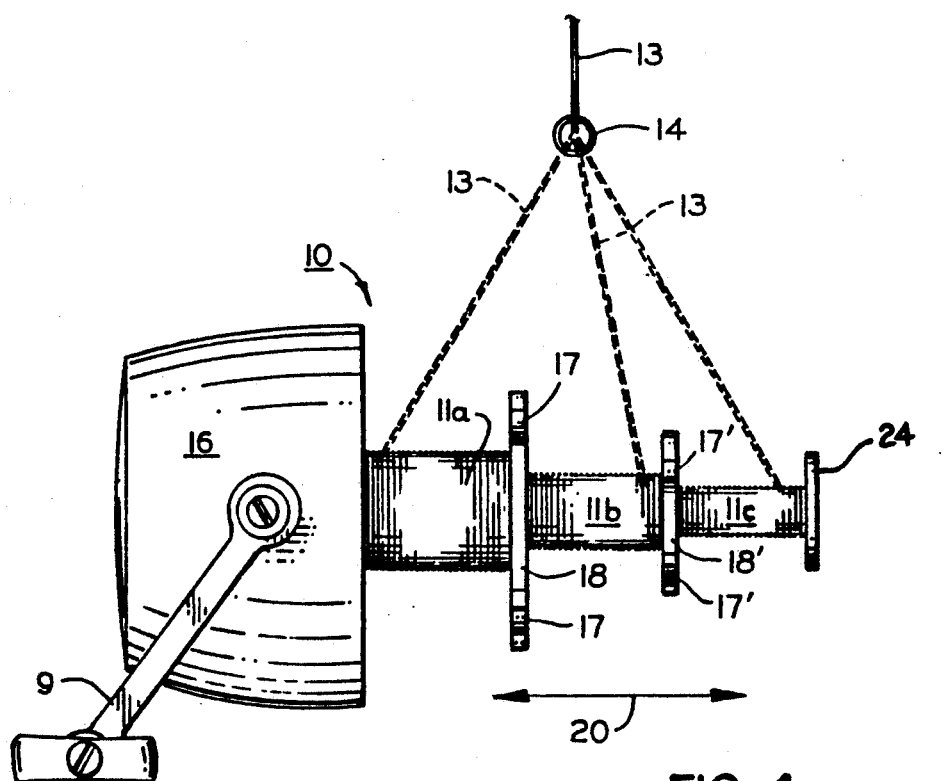
FIG. 4 is a side view of an alternate embodiment of the inventive fishing reel having a plurality of different sized drums.

Now referring also to FIG. 4, an alternate embodiment of the fishing reel 10 of the reciprocating or oscillating spool-type, similar to that shown and described in FIGS. 1 and 3, is shown. The reel 10 comprises a cranking handle 9, spool 11 and housing 16. The spool 11 comprises a large diameter drum 11a and two consecutively smaller diameter drums 11b and 11c, respectively.

When the cranking handle 9 reciprocates the spool 11, the fishing line 13, which is fed through the rotating eyelet line guide 14, is caused to reciprocate back-and-forth along, and wind upon, respective drums 11a, 11b and 11c.

Two interposing guide members 18 and 18', fixedly divide the different sized drums 11a from 11b and 11b from 11c, respectively.

It should be noted that for any given number of drums 11a, 11b, . . . , there are many combinations in which the drums may be connected. That is, not only may drums be connected large diameter, small diameter, smaller diameter, but they may also be connected large diameter, small diameter, large diameter, and so forth.

It will be obvious to the observer that the line speed will change with a constant or steady cranking or rotational speed imparted to cranking handle 9.

However, the angler can also superimpart another variable speed to line 13, by slightly changing the cranking speed every few turns.

The reel 10 of the invention is thus capable of changing the reel-in line speed without resorting to complex gearing or any conscious selection of levers or switches.

The speed will automatically change however fast or slow the crank handle 9 is rotated.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. In a fishing reel of the type having a reciprocating spool, the improvement for alternately varying the reel-in line speed without having to vary the cranking rate, comprising:

a first spool drum of said fishing reel having a first diameter radially disposed about a reel-in axis for winding a fishing line thereupon at a first reel-in line speed with respect to a substantially constant cranking rate;

a second spool drum of said fishing reel disposed adjacent to said first spool drum, said second spool drum having a second diameter radially disposed about said reel-in axis greater than said first diameter for winding said fishing line thereupon at a second reel-in line speed greater than said first reel-in line speed with respect to said substantially constant cranking rate;

means for cranking said fishing reel for winding said fishing line thereupon; and an interposing line guide member fixedly disposed between said first and said second spool drums for alternately switching said fishing line back-and-forth between said first and second spool drums during cranking of said fishing reel, said interposing line guide member having at least one projection extending radially from said reel-in axis and disposed upon a periphery thereof for intercepting said fishing line during reel-in, whereby said fishing line will be alternately wound upon said first and second spool drums respectively and said line speed will be alternated between said first and second reel-in line speeds.

2. The fishing reel of claim 1, wherein said line guide member includes a disc that is generally flat, and said at least one projection extends radially outward from said periphery of said disc.

3. The fishing reel of claim 2, wherein each of said at least one projection of said disc has a straight edge surface.

4. The fishing reel of claim 3, wherein each of said at least one projection of said disc also comprises a curved surface edge adjacent to said straight edge.

5. The fishing reel of claim 4, wherein there are at least two projections that are substantially equally spaced about said periphery.

6. The fishing reel of claim 4, wherein at least three projections extend from said periphery.

7. The fishing reel of claim 1, wherein said interposing line guide member comprises a disc having at least one notch cut into said periphery.

8. In a fishing reel having two adjacent reciprocating winding spools with different drum diameters, the improvement comprising:

an interposing fishing line guide disposed between said winding spools having at least one projection extending radially from a reel-in axis and disposed upon a periphery thereof for intercepting said fishing line during reel-in, for alternately switching a fishing line between said two spools during reel-in, whereby said fishing line reel-in will automatically alternate its line speed as said line is would upon alternate winding spools.

9. The fishing reel of claim 8, wherein said fishing line guide comprises a cam-like disc.

10. The fishing reel of claim 9, wherein said cam-like disc further includes a number of spaced-apart, radially extending projections for engaging with said fishing line.

11. A fishing reel having a reciprocating spool, comprising:

a first winding drum having a first diameter for winding a quantity of fishing line thereon;

subsequent winding drums having diameters different than said first diameter for winding a quantity of fishing line thereon, each of said subsequent winding drums being disposed adjacent to said first winding drum and adjacent to one another and having a common rotational axis;

a switching means disposed between said first and each of said subsequent winding drums for switching said fishing line back-and-forth along said winding drums during reel-in of said fishing line, said switching means having cam-like projections extending from a periphery thereof and disposed radially from said common rotational axis; and crank means for rotative winding said fishing line among one, and then the others of said winding drums, said switching means switching said fishing line at least once every revolution of said crank means, whereby reel-in line speed will vary with constant rotation of said crank means.

12. The fishing reel of claim 11, wherein said cam-like projections are perpendicular to the common rotational axis of said winding drums.

13. The fishing reel of claim 11 wherein said projections have a straight edge surface.

14. The fishing reel of claim 11 wherein there are at least three projections.

15. The fishing reel of claim 11, wherein said switching means further comprises an interposing line guide member that comprises a disc having at least one notch cut into a periphery thereof.

* * * * *